United States Patent Office 2,980,663
Patented Apr. 18, 1961

2,980,663
POLYMERISATION PROCESS
Stefan Kazimierz Lachowicz, North Cheam, England, assignor to The Distillers Company Limited, Edinburgh, Scotland, a British company
No Drawing. Filed Mar. 25, 1957, Ser. No. 647,941
Claims priority, application Great Britain Apr. 7, 1956
7 Claims. (Cl. 260—93.7)

The present invention relates to the ploymerisation under mild conditions of temperature and pressure of aliphatic α-olefins, as herein defined, to give products having high molecular weights. The products are substantially linear and have great utility for the preparation of films, fibres, moulded articles and the like. A more limited aspect of the invention relates to the polymerisation of asymmetrical α-olefins having at least three carbon atoms in the molecule to give isotactic or highly crystalline polymers.

According to the present invention the process for the polymerisation of aliphatic α-olefins, as herein defined, comprises contacting the α-olefin in an inert liquid medium with a catalyst system formed by mixing a dispersed aluminium fluoride compound having the formula $$NaAl(C_2H_5)_3F$$

with a soluble titanium compound.

By an "aliphatic α-olefin" is meant a hydrocarbon having the formula $CH_2:CHR$ where R is an alkyl group or hydrogen atom. Examples of suitable compounds are ethylene, propylene, 1-n-butene and 1-n-hexene. These α-olefins can be polymerised alone to form homopolymers or as mixtures among themselves or with other co-polymerisable compounds to give rise to valuable copolymers.

The aluminium fluoride compound having the formula $NaAl(C_2H_5)_3F$ can be readily prepared by mixing sodium fluoride with aluminium tri-ethyl or di-ethyl aluminium chloride in appropriate proportions in a liquid medium, most suitably the medium in which the polymerisation is to be carried out, so that the aluminium compound is produced in the form of a very fine precipitate which is readily dispersible throughout the reaction medium.

Any "soluble" titanium compound can be used in the process of the present invention. By "soluble" is meant that the titanium compound chosen dissolves in the liquid medium employed to an extent sufficient to enable it to react with the aluminium fluoride compound dispersed in the medium and thus form the active catalyst system. The preferred titanium compound, titanium tetrachloride, is a liquid which is soluble in (i.e. miscible with) hydrocarbon solvents, for example liquid aliphatic hydrocarbons obtained by the fractional distillation of petroleum. Many other soluble titanium compounds are known and have been described in connection with polymerisation reactions carried out by what is known as the Ziegler process. This known process for the ploymerisation of α-olefins comprises contacting the olefin with a catalyst system formed by mixing an organ-metallic compound such as aluminium tri-ethyl with a compound of titanium. Any such compound of titanium which is soluble in the liquid medium used in the process of the present invention can be employed as the soluble titanium compound of the present invention.

The proportion of aluminium fluoride compound to titanium compound employed to form the catalyst system can be varied considerably. Preferably a molar excess of the aluminium compound is employed.

Any liquid which is inert, i.e. does not react with and destroy the components of the catalyst system or the system itself, can be used as the liquid medium in which to carry out the reaction. The liquid chosen must not dissolve the aluminium fluoride compound but must be a solvent at least to some extent for the titanium compound. Examples of the preferred liquids are aliphatic, cycloaliphatic and hydrogenated aromatic hydrocarbons such as pentane, hexane, cyclohexane, tetrahydronaphthalene, decahydronaphthalene and mixtures thereof. The higher paraffins, aromatic hydrocarbons such as benzene and xylene, halogenated aromatic hydrocarbons such as ortho-dichlorbenzene and chlorinated naphthalene and mixtures thereof can also be employed, but fully saturated compounds are preferable. The quantity of liquid vehicle employed can be varied considerably and should preferably be such that the final recovery and fractionation of the polymeric material is facilitated.

If the aliphatic α-olefin is a liquid under the conditions of the polymerisation reaction, the liquid medium may consist of the olefin itself. If desired it may be diluted with an inert liquid, for instance, one of the liquids mentioned above.

The preparation of the catalyst system by mixing the aluminium compound and the titanium compound and the polymerisation reaction are preferably carried out in the absence of molecular oxygen and water. Most suitably the polymerisation is carried out in an atmosphere of the α-olefin to be polymerised, when it is a gas, or of an inert gas, for example, nitrogen or argon, when the olefin is a liquid. Inert gases can be used to flush out the polymerisation vessel prior to the admission of the various component compounds of the reaction mixture. The catalyst systems and their components are destroyed by reaction with oxygen or water and, consequently, if either of these are present in excess no polymerisation will take place. Small quantities of oxygen or water are removed by reaction with part of the catalyst system or its components and any undestroyed catalyst left after this reaction initiates polymerisation in the usual way.

The catalyst systems of the present invention are generally very active and polymerisation may be initiated at normal ambient temperatures with reactive α-olefins. The rate of polymerisation is generally increased by raising the temperature of the reaction mixture, but the polymerisation reaction should not be carried out at a temperature above the melting point of the aluminium fluoride compound i.e. about 60° C.

It is unnecessary to employ elevated pressures in order to bring about the polymerisation of α-olefins according to the present invention. However, for convenience of handling normally gaseous olefins, for example ethylene and propylene, it is advantageous to employ slightly elevated pressures and preferably the present process is carried out with such olefins under a pressure in the range of 50–500 pounds per square inch gauge (p.s.i.g.).

Polymerisation according to the process of the present invention is brought about by mixing the dispersed aluminium fluoride compound with the titanium compound in the liquid medium to form the catalyst system and then adding the α-olefin if it is not itself forming the reaction medium. Alternatively, it may be advantageous, when polymerising a gas to form the catalyst system in the presence of the olefin. When this procedure is adopted one of the components of the catalyst system, most suitably the aluminium flouride compound, is mixed with the inert liquid medium and the mixture and the vessel containing it saturated with the α-olefin. The titanium compound is then added and it will be found that rapid polymerisation takes place and further quantities of the α-olefin can be passed into the reaction mixture and polymerised.

An important aspect of the present invention relates to the polymerisation of asymmetrical α-olefins having at least three carbon atoms in the molecule to produce isotactic or highly crystalline polymers.

Such asymmetrical α-olefins have the formula

$$R-CH=CH_2$$

where R represents an alkyl group. In the polymerisation of such compounds it is possible for the monomeric units to distribute themselves within the polymer chains so that the substituents R are disposed either in a random manner or in a definite spacial relationship to each other. In practice it has been found that the polymers formed from asymmetrical α-olefins by low temperature and pressure polymerisation techniques fall into two general classes. In the first class the polymers are amorphous and it is generally believed that the side chain substituents R attached to the individual polymer chains are arranged in a random manner. In the second class the polymers are highly crystalline and it is generally believed that the crystallinity results from a particular arrangement of the monomer units within the polymer chains which results in the substituents R on the polymer chain having a definite spacial relationship to each other.

In general an amorphous polymer is more soluble in a given solvent than a crystalline polymer of the same monomer having approximately the same molecular weight. It is thus possible to fractionate polymeric material containing both amorphous and crystalline polymers into amorphous and crystalline fractions by the use of a suitable solvent or solvents. Useful solvents for the fractionation of polymers derived from α-olefins are hydrocarbon solvents, such as for example, petroleum fractions and cyclohexane. It should be remembered that as the molecular weight of a polymer increases, whether it is amorphous or crystalline, its solubility in a given solvent decreases.

It has been found, most surprisingly, that when the polymerisation of asymmetrical α-olefins such as propylene or 1-n-butene is carried out according to the present invention, polymers are obtained which contain a usefully high proportion of crystalline material. The exact proportion of crystalline material obtained from a given polymerisation reaction can be varied by altering the conditions of the polymerisation reaction. For instance, variation in the temperature of the polymerisation and in the ratio of aluminium fluoride compound to the titanium compound affect the proportion of crystalline material in the final product. It is found that polymerisation according to the process of the present invention gives rise to polymers containing a higher proportion of crystalline material than known similar polymerisation systems, i.e., as obtained by the use of aluminum triethyl mixed with titanium tetrachloride, when carried out under similar conditions.

The polymeric material produced according to the present invention from asymmetrical aliphatic α-olefins, for example, propylene, consists of a mixture of amorphous and crystalline polymers whose molecular weights may be distributed over a range. Advantageously, the material is first washed with an aqueous mineral acid solution which removes inorganic contaminants and it is then isolated by conventional procedures known in the art. The material can be fractionated by treatment with a solvent or solvents which dissolves the more soluble fraction of the material. In this way the bulk of the amorphous material and any low molecular weight crystalline material which may be present is removed as a solution and the residue of undissolved material will contain the bulk of the high molecular weight crystalline material together with any small amounts of very high molecular weight amorphous polymers which may have been produced. By repeating the fractionation process, if desired with different solvents, it is possible to fractionate the material into further amorphous and crystalline portions and at the same time remove undesirable polymers of too high or too low molecular weight.

The following examples illustrate the process of the present invention.

Example 1

A stainless steel reactor of one litre capacity equipped with a mechanical stirrer was filled with a suspension of 10 g. (0.064 mole) of the aluminium fluoride compound in 550 millilitres of petroleum ether (B.P. 100–120° C.) and 5.7 g. (0.032 mole) of titanium tetrachloride dissolved in 50 millilitres of petroleum ether was added to it with stirring. All these operations were carried out in the absence of moisture and air. The contents of the reactor were warmed up to 40° C., and ethylene was passed in at 25 p.s.i.g. and this pressure was maintained constant throughout the reaction. The temperature inside the reactor rose to 50° C., and then began to fall slowly. After 4 hours the experiment was interrupted, the contents of the reactor discharged and the unused catalyst decomposed by addition of ethanol. After washing with dilute hydrochloric acid solution in ethanol and drying, 35 g. of white, high molecular weight polyethylene were obtained.

Example 2

A suspension of 11 grams of the aluminium fluoride compound in 350 millilitres of petroleum ether (B.P. 100–120° C.) was introduced into a stainless steel reactor of one litre capacity and equipped with a mechanical stirrer. The solution was then saturated with propylene at 35 p.s.i.g. and 40° C. and 4.7 grams of titanium tetrachloride dissolved in 50 millilitres of petroleum ether was added with stirring. The gas consumption started at once and more propylene had to be supplied to maintain the pressure at a constant value. After four hours the gas supply was disconnected and the residual gas released. The reactor was opened and a greenish-black, thick mass contained in it was discharged, washed with methanol and hydrochloric acid-methanol solution until the polymer assumed the form of a white powdery solid. A yield of 65 grams of solid polymer was obtained which has a specific viscosity of 0.95 measured in ortho-dichlorobenzene at 125° C. (0.667% solution). Infra-red spectrum analysis showed that the polymer was 65% crystalline. Successive extraction by the solvents indicated below, at their boiling points, gave the following results:

| | Weight-percent extracted |
|---|---|
| Acetone soluble fraction | 11 |
| Ether soluble fraction | 22.5 |
| Petroleum ether soluble fraction | 25.5 |
| Petroleum ether insoluble fraction | 41.0 |

The acetone fraction was a viscous liquid, the ether fraction a rubbery solid and the two highest fractions were powdery solids which after pressing at 150° C. gave tough transparent films. The first order transition point of the two highest fractions was in the neighbourhood of 168° C. and they were about 89% crystalline.

Example 3

A suspension of 9.8 grams of the aluminium fluoride compound in 350 millilitres of petroleum ether was introduced into the stainless steel reactor used in Example 1 and was followed by a solution of 2.3 millilitres of titanium tetrachloride in 50 millilitres of petroleum ether. The mixture was warmed to 40° C. and saturated with propylene at 25 p.s.i.g. The addition of gas to maintain the pressure was continued for four hours, after which the residual gas was released and the polymer treated as described in Example 2. Altogether 24 grams of white powdery polymer were obtained. The polymer was not completely soluble in ortho-dichlorobenzene at 125° C. The polymer was 83% crystalline and only 28% of it was removed by successive extractions with boiling ether and n-heptane. The n-heptane insoluble fraction was 88% crystalline according to infra-red analysis and could be pressed into tough, transparent film of good surface appearance.

I claim:

1. A process for the polymerisation of aliphatic α-olefins having the formula $CH_2=CHR$ where R is selected from the group consisting of hydrogen and lower alkyl groups, which comprises contacting the α-olefin in an inert liquid medium at a temperature below 60° C. and at a pressure within the range from atmospheric pressure to about 500 p.s.i.g. with a catalyst system formed by mixing a solid, dispersed aluminium fluoride compound, having the formula $Na[Al(C_2H_5)_3F]$, with a titanium compound soluble in the liquid medium.

2. A process as claimed in claim 1, wherein a molar excess of the aluminium fluoride compound over the titanium compound is employed.

3. A process as claimed in claim 1, wherein the aluminium fluoride compound is prepared and used in the form of a fine precipitate obtained by mixing sodium fluoride with a member of the group consisting of aluminium triethyl and di-ethyl aluminium chloride in the inert liquid medium in which the polymerisation is to be carried out.

4. A process as claimed in claim 1, wherein the titanium compound is titanium tetrachloride.

5. A process as claimed in claim 1, wherein the inert liquid medium is a fully saturated hydrocarbon.

6. A process as claimed in claim 1, wherein the α-olefin is propylene and a product containing a high proportion of crystalline material is obtained.

7. In the polymerization of aliphatic α-olefins having the formula $CH_2=CHR$, where R is a member selected from the group consisting of hydrogen and lower alkyl, by contacting the α-olefin in an inert liquid medium with a catalyst system formed by mixing with a titanium compound soluble in the liquid medium a second component, the improvement wherein said second component is a solid, dispersed aluminium fluoride compound having the formula $Na[Al(C_2H_5)_3F]$.

References Cited in the file of this patent

UNITED STATES PATENTS

| | | |
|---|---|---|
| 2,827,446 | Breslow | Mar. 18, 1958 |
| 2,844,615 | Ziegler | July 22, 1958 |
| 2,862,917 | Anderson et al. | Dec. 2, 1958 |

FOREIGN PATENTS

| | | |
|---|---|---|
| 538,782 | Belgium | Dec. 6, 1955 |

OTHER REFERENCES

Organo-Metallic Compounds, Coats, John Wiley & Sons, Inc., N.Y., pages 80–81 (1956).